(12) United States Patent
Ozenne et al.

(10) Patent No.: US 9,634,727 B2
(45) Date of Patent: Apr. 25, 2017

(54) NFC ARCHITECTURE

(71) Applicant: NXP B.V., Eindhoven (NL)

(72) Inventors: Patrick Andre Yves Ozenne, Benouville (FR); Erich Merlin, Gratkorn (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/268,066

(22) Filed: May 2, 2014

(65) Prior Publication Data
US 2014/0335784 A1 Nov. 13, 2014

(30) Foreign Application Priority Data

May 7, 2013 (EP) ..................................... 13290101

(51) Int. Cl.
*H04B 5/00* (2006.01)
*H04B 7/06* (2006.01)
*H04B 7/08* (2006.01)

(52) U.S. Cl.
CPC ............. *H04B 5/0031* (2013.01); *H04B 5/00* (2013.01); *H04B 5/0087* (2013.01); *H04B 7/0602* (2013.01); *H04B 7/0802* (2013.01)

(58) Field of Classification Search
CPC .................................................... H04B 5/0031
USPC ........................... 455/41.1, 90, 575; 375/267
See application file for complete search history.

(56) References Cited

U.S. PATENT DOCUMENTS

| | | | | |
|---|---|---|---|---|
| 5,991,643 | A * | 11/1999 | Chao-Cheng | .......... H01Q 1/242 342/374 |
| 6,456,938 | B1 * | 9/2002 | Barnard | ................. A63B 57/00 340/990 |
| 2010/0194660 | A1 * | 8/2010 | Yoneda et al. | ................. 343/867 |
| 2010/0245054 | A1 | 9/2010 | Kim | |
| 2012/0196530 | A1 * | 8/2012 | Moosavi | ........... H04W 52/0251 455/41.1 |
| 2012/0299389 | A1 | 11/2012 | Lee et al. | |
| 2013/0322562 | A1 * | 12/2013 | Zhang | .................. H04B 7/0404 375/267 |
| 2014/0129425 | A1 * | 5/2014 | Yang | .................. G06K 7/10158 705/39 |

FOREIGN PATENT DOCUMENTS

WO 2011/072310 A1 6/2011

OTHER PUBLICATIONS

NXP; "DC2NFC7-2.6 MHz, 200mA, 7V step-up DC-to-DC converter with Integrated TX Buffers-Rev.0"; Objective data sheet; 15 pages (Apr. 4, 2013).
Extended European Search Report for application No. 13290101.8 (Oct. 24, 2013).

* cited by examiner

Primary Examiner — Hsin-Chun Liao

(57) ABSTRACT

Disclosed is an integrated circuit, system or architecture suitable for NFC functionality and including an NFC companion block connectible to a power source and capable to providing a non-continuous power boost to NFC signals, inter alia, thereby facilitating use of a broader range of antennas, multiple antennas, and thereby providing greater NFC functionality and versatility Further disclosed is a detachable antenna embedded in a potentially detachable shell which closely fits a mobile device and is adapted for use with the above mentioned integrated circuit, system or architecture.

20 Claims, 3 Drawing Sheets

NFC ARCHITECTURE

CROSS-REFERENCE TO RELATED APPLICATIONS

This application claims the priority under 35 U.S.C. §119 of European patent application no. 13290101.8, filed on May 7, 2013, the contents of which are incorporated by reference herein.

FIELD OF THE INVENTION

Illustratively, this application relates in general to Near Field Communication (NFC) technologies, and more particularly to architectures, systems, or integrated circuits which utilize NFC.

BACKGROUND OF THE INVENTION

NFC is a short range wireless connectivity technology that enables the exchange of various types of information, such as numbers pictures, MP3 files or digital authorizations between two NFC enabled devices such as mobile phones or between a mobile phone and a compatible chip card or reader that are positioned close to each other. Applications for NFC include use as an access control for content and for services such as cashless payment, ticketing, etc.

NFC is often defined as operating in a frequency range centered on 13.56 MHz. Communications between NFC-capable devices may exist in a variety of modes, including: peer-to-peer; active-passive (or reader-writer); and so-called card emulation.

As NFC technology evolves, it is often desired that a single equipment, illustratively a mobile phone, be capable of acting in more than one mode. For example, a cell phone might be capable of acting (i) in the card emulation mode, thereby facilitating a credit-card purchase transaction; and (ii) in the reader mode, thereby facilitating reading of smart posters or other various tags or other similar devices. In addition, it may be desired for the mobile phone to be capable of peer to peer information exchange with another mobile phone.

These and other modes of operation may have somewhat different power requirements. Those concerned with the development of NFC technology have sought improved architectures, systems, and integrated circuits to facilitate improved performance and versatility of NFC equipments.

SUMMARY OF THE INVENTION

Included in the invention are: an integrated circuit having an NFC companion block connectable to a (first) antenna and connectable to a power source; the block being controllable to cause it to provide a non-continuous power boost from the power source to the antenna.

Further included is an antenna matching block for providing impedance matching to either the first antenna or a second antenna.

Also included are: an NFC controller block connected to the NFC companion block; the controller providing control of the NFC companion block to cause the NFC companion block to provide a non-continuous power boost from the power source to either the first antenna or second antenna.

In addition, included is an antenna change block for switching between the first and second antennas.

Furthermore, the second antenna may be embedded in a detachable shell.

In addition, included in the invention is a mobile device which includes: an NFC companion block; an NFC controller block connected to the NFC companion block and capable of controlling operation of the NFC companion block; the NFC controller block containing a transmitter for providing signals to the NFC companion block; a power source connected to the NFC companion block; at least one antenna connected to the NFC companion block; the NFC companion block being capable of providing a non-continuous power boost from the power source to the antenna.

DETAILED DESCRIPTION OF ILLUSTRATIVE EMBODIMENTS

Figure 1:
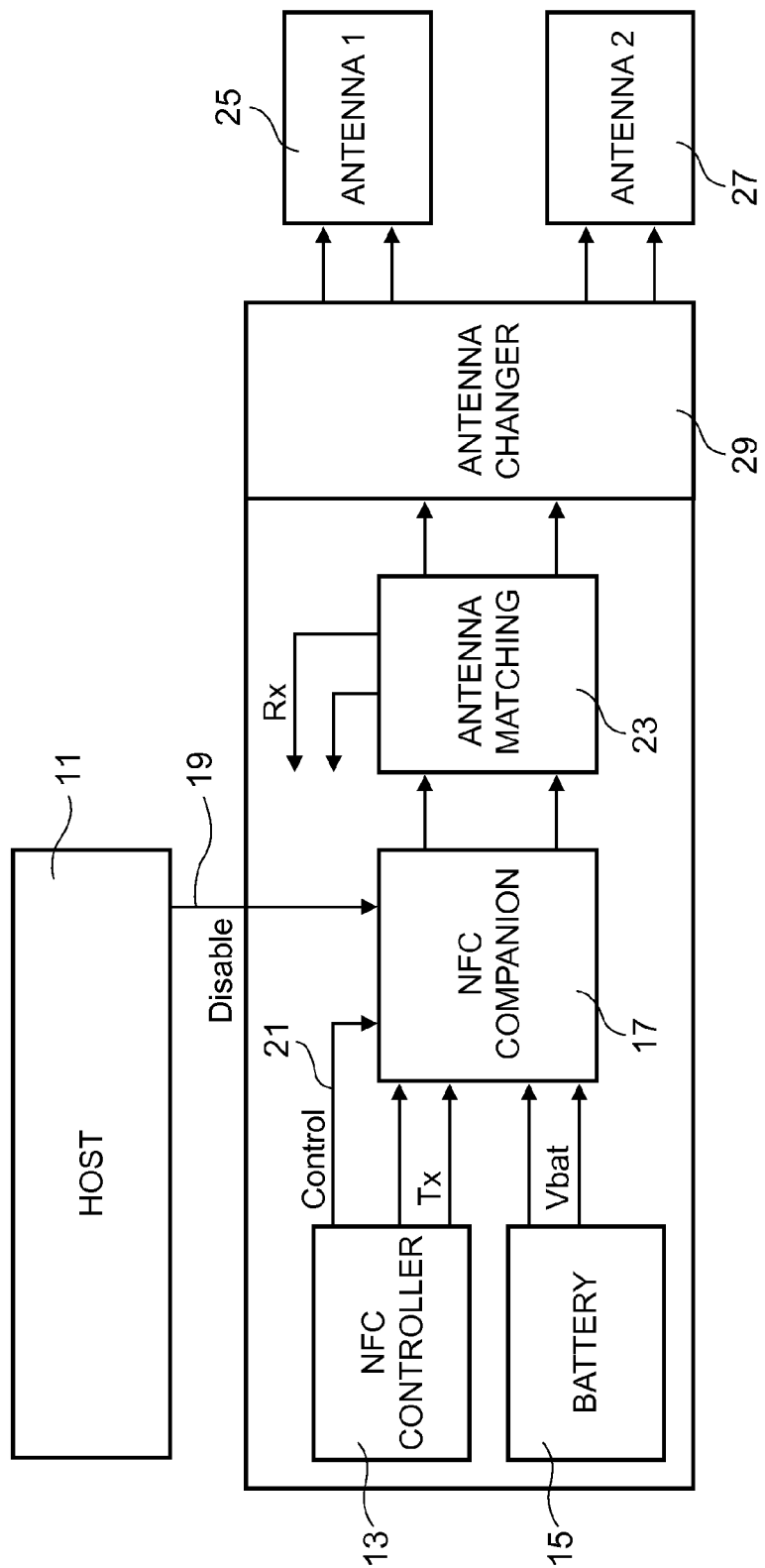
FIG. 1 is a block diagram showing an illustrative embodiment of the invention, illustratively an NFC architecture.

In FIG. 1 an illustrative embodiment of an architecture, illustratively an NFC architecture is depicted. Reference numeral 11 denotes block which is an application processor (Host) which may be located in a mobile device. Host 11 communicates with NFC controller, block 13. Reference numeral 15 denotes a Battery or other power source. Block 17, designated NFC companion, is connected to Battery or other power source 15 and block 13, NFC controller.

Block 17, NFC companion, may, in some embodiments, be functionally disabled by block 11, Host, as designated by link 19. Generally, however, block 17, NFC companion, operates under the control of block 13, NFC controller, as designated by link 21. Block 13, NFC controller, also includes a transmitter (not explicitly shown in FIG. 1). The transmitter is typically powered via block 15, Battery or other power source, through connections not shown.

Block 17, NFC companion, is also connected to block 15, Battery or power source. Furthermore, block 17, NFC companion, is connected to block 23, Antenna matching circuitry.

Block 29, Antenna matching circuitry is connected to block 29, Antenna changer, which may, illustratively be a switch. Block 29, Antenna changer is connected to at least two blocks, here, blocks 25 and 27 which represent, respectively antenna1 and antenna 2.

Illustratively, in a first mode of operation, block 25, antenna1, may be designed to operate suitably at a low power level. Block 29, antenna changer, switches to couple block 25, antenna1 to block 23, Antenna matching circuitry, while disconnecting block 27, antenna2. Block 17, NFC companion, passes a signal substantially unchanged (i.e. without any increase in power level) from block 13, NFC controller, to block 23, Antenna matching circuitry.

In a second mode of operation, block 27, antenna2 may be designed to operate suitably at a higher power level. Block 29, antenna changer, switches to couple block 27, antenna2, to block 23, Antenna matching circuitry, while disconnecting block 25, antenna1. However, in this second mode of operation, block 17, NFC companion utilizes power from block 15, Battery or power source, to increase the power level of the signal coming from block 13, NFC controller, and passes the increased-power-level signal to block 23, Antenna matching circuitry through block 29 to block 27, antenna2. The amount of power boost may be controlled as determined by block 13, NFC controller, possibly through interaction with block 11, Host.

In another embodiment, block 29, Antenna changer, may couple block 25, antenna1 to block 23, Antenna matching circuitry, while disconnecting block 27, antenna2. Block 17, NEC companion may utilize power from block 15, Battery or power source, to increase the power level of the signal coming from block 13, NEC controller and pass the increased power-level signal to block 23, Antenna matching circuitry through block 29 to block 25, antenna1.

Currently many mobile devices such as mobile phones include an NFC controller. Typically, antennas in such mobile devices are designed to achieve the minimum performance required to detect smart poster tags and also to be able to pay bills by phone with the existing infrastructure. It is desired that switching from one mode of operation to another be done without explicit interaction by the user, thus requiring the controller to switch from one mode of operation to another without user interaction. The consequence of this design strategy is a high antenna cost and significant design constraints relative to the antenna size and location of the antenna in the mobile device.

Disclosed embodiments allow for smaller or cheaper antennas while providing higher level of performance through the power boost provided via block 17, NFC companion. Furthermore, the disclosed embodiments facilitate active load modulation in card mode as opposed to passive load modulation. Such embodiments facilitate mobile Point of Sale (mPOS) functionality (for which operating volume and field strength requirements are higher than other applications). The power boost provided via block 17, NFC companion facilitates somewhat longer distance communication between the mobile device and whatever the mobile device is communicating with. Furthermore, the power boost feature is non-continuous, being only enabled when desired, thus contributing to efficient power management.

The various functional blocks described in the embodiments above may be combined in various ways into integrated circuits. For example, block 17, NFC companion, may be combined with block 13, NFC controller. Or, block 17, NFC companion may be combined with other blocks into a "connectivity combo" chip which may, illustratively include WiFi, GPS, Bluetooth, and possibly other features. The power boost feature of block 17, NFC companion may be utilized to provide extra power for the aforementioned features also. Various blocks described herein may be combined into larger blocks.

Furthermore, evolving mobile phone designs often use metal shells and may include wireless charging. Both the use of metal shells and need for wireless charging place constraints upon antenna size which may be alleviated by the disclosed embodiments.

Figure 2:
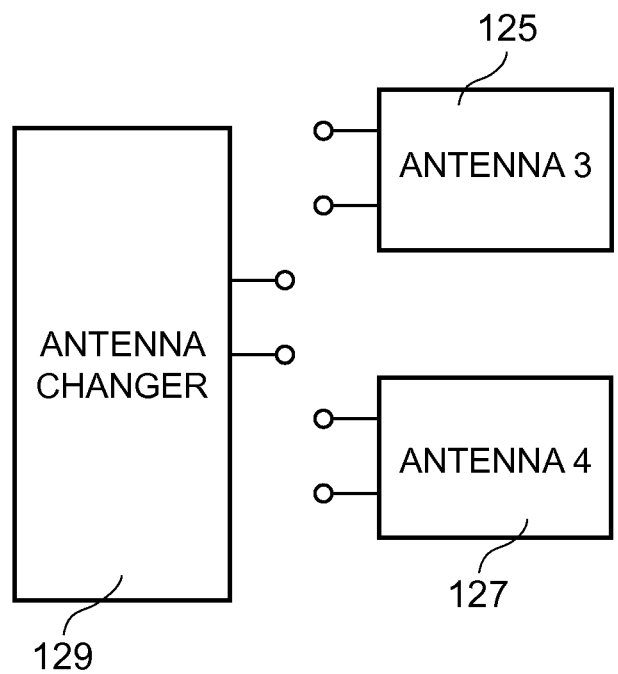
FIG. 2 is a block diagram showing another illustrative embodiment of the invention.

In a further embodiment, depicted in FIG. 2, block 129, Antenna changer, may be a simple terminal, connectable to a variety of antennas. Block 125, antenna3 and block 127, antenna4 may be detachable/attachable antennas encapsulated in a removable rear cover or shell adapted to closely fit the mobile device. For many NFC applications, for example, antenna3 may be used without the power boost feature of block 17, NFC companion, being utilized. The power boost feature may be automatically disabled by sensing the impedance of antenna3. However, if, for example, use in an mPOS application is contemplated, antenna3 may be disabled by removing the cover or shell in which antenna3 is embedded and substituting antenna4 which is embedded in a similar cover or shell. The power boost feature enabled by block 17, NFC companion, may automatically be enabled by sensing the difference in antenna impedance.

Figure 3:
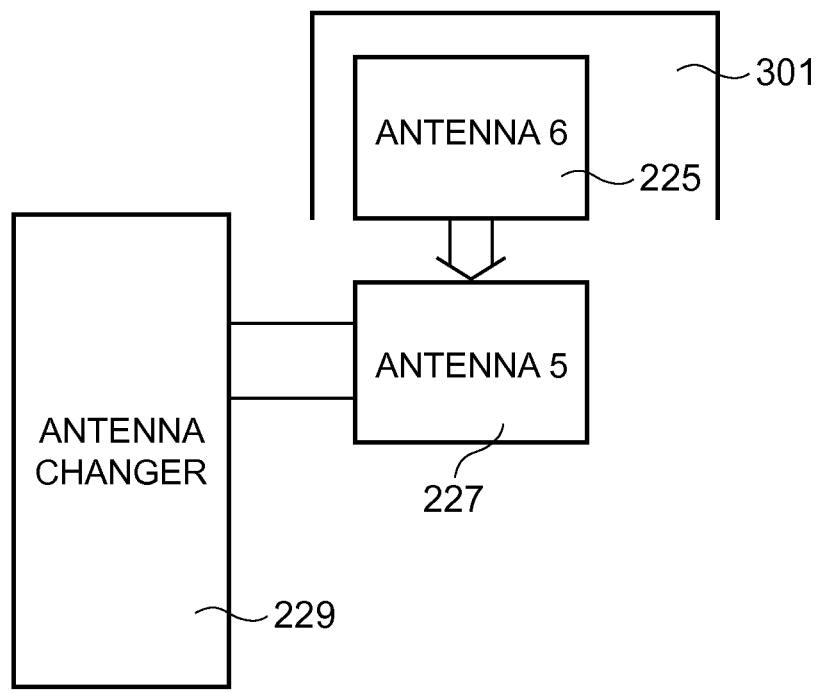
FIG. 3 is a block diagram showing another illustrative embodiment of the invention.

Another embodiment is illustrated in FIG. 3. In FIG. 3, block 229 is fixedly connected to block 227, antenna5. In many modes of NFC operation, antenna5 provides suitable operation without utilization of the power boost capabilities of block 17, NFC companion. If mPOS or other services are needed which require enhanced transmission capabilities, a (possibly detachable) shell or cover 301 which closely fits the mobile device may be fitted on the mobile device. Shell 301 contains embedded block 225, antenna6. The power boost feature of block 17, NEC companion is engaged. Extra power is provided by means previously described to block 227, antenna5, and thence also to block 225, antenna6 via electromagnetic coupling.

Various illustrative embodiments are described in reference to specific examples. The illustrative examples are selected to assist a person of ordinary skill in the art to form a clear understanding of, and to practice the various embodiments. However, the scope of systems, integrated circuits structures and devices that may be constructed to have one or more of the embodiments, and the scope of methods that may be implemented according to one or more of the embodiments, are in no way confined to the specific illustrative examples that have been presented. On the contrary, as will be readily recognized by persons of ordinary skill in the relevant arts based on this description, many other configurations, arrangements, and methods according to the various embodiments may be implemented.

To the extent positional designations such as top, bottom, upper, lower have been used in describing this invention, it will be appreciated that those designations are given with reference to the corresponding drawings, and that if the orientation of the device changes during manufacturing or operation, other positional relationships may apply instead. As described above, those positional relationships are described for clarity, not limitation.

The present invention has been described with respect to particular embodiments and with reference to certain drawings, but the invention is not limited thereto, but rather, is set forth only by the claims. The drawings described are only schematic and are non-limiting. In the drawings, for illustrative purposes, the size of various elements may be exaggerated and not drawn to a particular scale. It is intended that this invention encompasses inconsequential variations in the relevant tolerances and properties of components and modes of operation thereof. Imperfect practice of the invention is intended to be covered.

Where the term "comprising" is used in the present description and claims, it does not exclude other elements or steps. Where an indefinite or definite article is used when referring to a singular noun, e.g. "a" "an" or "the", this includes a plural of that noun unless something otherwise is specifically stated. Hence, the term "comprising" should not be interpreted as being restricted to the items listed thereafter; it does not exclude other elements or steps, and so the scope of the expression "a device comprising items A and B" should not be limited to devices consisting only of components A and B.

The invention claimed is:

1. An integrated circuit comprising:
    a first antenna, a second antenna and an antenna matching circuit;
    an antenna changer circuit for switching between the first antenna and the second antenna; and
    an NFC companion circuit configured and arranged to be connected to the first antenna and connected to a power source, the NFC companion circuit being further configured and arranged to operate in a first mode and in a second mode by passing a signal from another circuit toward the first antenna, wherein in the respective first and second modes the NFC companion circuit is configured and arranged to pass the signal at a first power level and at a second power level that is higher than the first power level, wherein in the second mode the NFC companion circuit is configured and arranged to provide a non-continuous power boost by using the power source to increase a power of the signal being provided from the other circuit to the first antenna, wherein the NFC companion circuit is configured and arranged to enable the power boost in response to a difference in antenna impedance, and therein being automatically switchable between the first mode and the second mode and between the first and second antennas.

2. The integrated circuit of claim 1, wherein the antenna matching circuit is configured and arranged to provide an impedance match to either the first antenna or the second antenna.

3. The integrated circuit of claim 2, wherein the second antenna is designed to operate at a higher power level than the first antenna.

4. The integrated circuit of claim 1, wherein the other circuit includes an NFC controller circuit connected to the NFC companion circuit, wherein in the second mode the NFC controller circuit is configured and arranged to control the NFC companion circuit and to cause the NFC companion circuit to provide the non-continuous power boost to the signal provided from the NFC controller circuit, and wherein in the first mode the NFC companion circuit is further configured and arranged to pass the signal without increasing the power level of the signal provided from the NFC controller circuit.

5. The integrated circuit of claim 1, wherein the NFC companion circuit is configured and arranged to enable the power boost in response to a sensed difference in antenna impedance.

6. The integrated circuit of claim 5, in which the second antenna is embedded in a detachable shell.

7. The integrated circuit of claim 1, further including circuitry configured and arranged for communications using a protocol chosen from the group consisting of: WiFi, GPS and Bluetooth.

8. A mobile device comprising:
an NFC companion circuit;
an NFC controller circuit connected to the NFC companion circuit and configured and arranged to control operation of the NFC companion circuit, and wherein the NFC controller circuit includes a transmitter configured and arranged to provide signals to the NFC companion circuit;
a power source connected to the NFC companion circuit; and
two antennas connected to the NFC companion circuit, wherein the NFC companion circuit is configured and arranged to operate in a first mode and in a second mode by passing the signals from the NFC controller circuit toward a first antenna of the two antenna, wherein in the respective first and second modes the NFC companion circuit is further configured and arranged to pass the signals at a first power level and at a second power level that is higher than the first power level, wherein in the second mode the NFC companion circuit is configured and arranged to provide a non-continuous power boost by using the power source to increase a power of the signals being provided from the NFC controller circuit to a second antenna of the two antennas, wherein the NFC companion circuit is configured and arranged to enable the power boost in response to a sensed difference in antenna impedance between the two antennas.

9. The mobile device of claim 8, further including a detachable shell closely fitting said mobile device and containing the second antenna embedded therein, wherein the NFC companion circuit is configured and arranged to enable the power boost, and thereby switch between the first mode and second mode.

10. The mobile device of claim 8, wherein the NFC companion circuit is configured and arranged to provide the non-continuous power boost by increasing a power-level of the signals being provided from the NFC controller circuit to the first antenna, wherein the increased power-level is from the first power level to the second power level, and wherein in the first mode the NFC companion circuit is further configured and arranged to pass the signals from the NFC controller circuit without increasing the power-level of the signals being provided from the NFC controller circuit, wherein the NFC companion circuit is configured and arranged to enable the power boost, and thereby automatically switching between the first mode and second mode and switching between the first and second antennas.

11. The mobile device of claim 8, further including an antenna matching circuit configured and arranged to provide an impedance match to the antenna, and wherein the NFC companion circuit is configured and arranged to enable the power boost in response to a sensed difference in the antenna impedance.

12. The mobile device of claim 8, further including a detachable shell closely fitting the mobile device, wherein the two antennas is embedded in the detachable shell.

13. An integrated circuit comprising:
an NFC companion circuit connectable to a first antenna, a second antenna, and connectable to a power source, the NFC companion circuit being configured and arranged to operate in a first mode and in a second mode by passing a signal from an NFC controller circuit toward the first antenna, wherein in the respective first and second modes the NFC companion circuit is configured and arranged to pass the signal at a first power level and at a second power level that is higher than the first power level, wherein in the second mode the NFC companion circuit is configured and arranged to provide a non-continuous power boost to increase a power of the signal, in response to a sensed difference in antenna impedance, being provided from the NFC companion circuit to the first antenna from the first power level to the second power level, and thereby automatically switching between the first mode and the second mode and switching between the first and second antennas; and
the NFC controller circuit connected to the NFC companion circuit, wherein the NFC controller circuit is configured and arranged to control the NFC companion circuit to cause the NFC companion circuit to provide the non-continuous power boost.

14. The integrated circuit of claim 13, further including:
the first antenna configured and arranged to operate at the first power level in response to the NFC companion circuit passing the signal without the non-continuous power boost; and the second antenna configured and arranged to operate at the second power level in response to the NFC companion circuit passing the signal with the non-continuous power boost.

15. The integrated circuit of claim 14, further including:
antenna matching circuitry configured and arranged to provide an impedance match to the first antenna;
antenna changing circuitry configured and arranged to selectively connect the first antenna to the antenna matching circuitry; and
wherein in the first mode the NFC companion circuit and the NFC controller circuit are configured and arranged to provide the signal without the power boost to the antenna matching circuitry.

16. The integrated circuit of claim 14, further including:
antenna matching circuitry configured and arranged to provide an impedance match to the second antenna;
antenna changing circuitry configured and arranged to selectively connect the second antenna to the antenna matching circuitry; and
wherein in the second mode the NFC companion circuit and the NFC controller circuit are configured and arranged to provide the signal with the power boost to the antenna matching circuitry.

17. The integrated circuit of claim 14, wherein the NFC companion circuit and the NFC controller circuit are embedded in a mobile device and wherein the first antenna and the second antenna are embedded in a detachable shell closely fitting the mobile device.

18. The integrated circuit of claim 13, further including:
antenna matching circuitry configured and arranged to provide an impedance match to either the first antenna or the second antenna; and
antenna changing circuitry configured and arranged to selectively connect the first antenna or the second antenna to the antenna matching circuitry.

19. The integrated circuit of claim 13, wherein the NFC companion circuit is configured and arranged to enable the power boost by sensing the difference in antenna impedance.

20. The integrated circuit of claim 13, wherein the NFC companion circuit and the NFC controller circuit are embedded in a mobile device and wherein the first antenna is embedded in a detachable shell closely fitting the mobile device.

* * * * *